US009409134B1

(12) United States Patent
Jones et al.

(10) Patent No.: US 9,409,134 B1
(45) Date of Patent: Aug. 9, 2016

(54) EDUCTOR WITH BACKFLOW DEFLECTOR

(71) Applicant: Diversey, Inc., Duncan, SC (US)

(72) Inventors: Gareth Jones, Amsterdam (NL); Ian Sansom, Amsterdam (NL); Marcel van der Kraan, Rotterdam (NL); Seth Haanstra, Vinkeveen (NL); Richard Wenborn, Utrecht (NL)

(73) Assignee: Diversey, Inc., Charlotte, NC (US)

( * ) Notice: Subject to any disclaimer, the term of this patent is extended or adjusted under 35 U.S.C. 154(b) by 0 days.

(21) Appl. No.: 14/662,720

(22) Filed: Mar. 19, 2015

(51) Int. Cl.
| B05B 7/30 | (2006.01) |
| B01F 5/04 | (2006.01) |
| B01F 3/04 | (2006.01) |
| B01F 3/08 | (2006.01) |
| E03C 1/10 | (2006.01) |
| B05B 7/24 | (2006.01) |

(52) U.S. Cl.
CPC .............. *B01F 5/0415* (2013.01); *B01F 3/0446* (2013.01); *B01F 3/0865* (2013.01); *B01F 5/0413* (2013.01); *B05B 7/2443* (2013.01); *E03C 1/10* (2013.01); *B01F 2005/0443* (2013.01)

(58) Field of Classification Search
CPC .... B01F 5/0415; B01F 3/0446; B01F 5/0413; B01F 3/0865; B01F 2005/0443; E03C 1/10; B05B 7/2443

USPC .......... 239/310, 318; 137/890, 888, 889, 896, 137/216
See application file for complete search history.

(56) References Cited

U.S. PATENT DOCUMENTS

| 5,673,725 | A | * | 10/1997 | Russell | ................ | B01F 5/0413 137/216 |
| 5,839,474 | A | * | 11/1998 | Greaney | ............... | B01F 5/0077 137/889 |
| 5,862,829 | A | * | 1/1999 | Sand | ................... | A47L 15/4427 137/888 |
| 7,566,013 | B2 | * | 7/2009 | MacLean-Blevins | .... | B05B 7/12 239/310 |
| 2006/0032543 | A1 | * | 2/2006 | Hague | ................. | A47L 15/4427 137/888 |
| 2006/0260704 | A1 | * | 11/2006 | Sand | ..................... | B01F 3/0861 137/890 |

* cited by examiner

*Primary Examiner* — Steven J Ganey
(74) *Attorney, Agent, or Firm* — Rupert B Hurtey, Jr.

(57) ABSTRACT

Air gap eductor with backflow deflector deflects backflowing liquid, preventing backflowing liquid from contaminating water supply by contacting water jet nozzle above air gap. Backflow deflector plate blocks 40-80% of rim area at opening at upper end of eductor discharge tube, leaving 60-20% of rim area unblocked. With bifurcated asymmetry of from 40% to 100%, blocked and unblocked rim areas deflect backflowing liquid laterally, away from water jet nozzle.

19 Claims, 12 Drawing Sheets

EDUCTOR WITH BACKFLOW DEFLECTOR

FIELD

This invention relates to an eductor for mixing liquids, for example mixing a concentrated solution containing an active ingredient into a flow of water to provide a desired dilution of the concentrated solution. The invention also relates to a dispensing apparatus having such an eductor.

BACKGROUND

It is common practice in many industries, such as the hotel and catering industries, for chemicals such as those used for cleaning to be purchased as concentrated liquids and then diluted with water to give the correct concentrations for use. Proportioning dispensing apparatus have been designed to achieve the desired dilution of the concentrated solution and dispense the mixed diluted solution.

These dispensers have commonly employed so-called venturi-type devices, known as eductors, to aspirate or draw the concentrated solution into the water stream. In these eductors water traveling at a high velocity through a passage entrains and dilutes the concentrated solution at a point where a restricted flow channel in the passage widens. These dispensers are generally operated with water provided directly from the main water supply. As it is important to maintain the water supply free of contamination, the eductors normally employ an air gap to prevent backflow of the chemicals into the water source.

Typically, air gap eductors operate in an upright arrangement, i.e., a water jet is directed vertically downwards, across an air gap, thereafter passing into and through a venturi structure where the concentrated liquid is entrained. Thus the eductor generally comprises a nozzle to generate the jet of water which passes downward through the air gap and to the venturi below the air gap. The venturi has an inlet located on an upper surface to receive the jet of water. Not all the water in the jet passes into the venturi inlet because the inlet usually has a smaller cross section than the jet. For example, a water jet with a diameter of 2-4 mm may be used with an inlet having a diameter of 1.5-1.8 mm. This helps to ensure that sufficient pressure is generated in the venturi. There is therefore a fraction of the water which does not pass directly into and through the venturi structure. This excess water must be collected from the top of the venturi structure and directed to the exit of the venturi. Eductors have been provided with bypass channels to enable excess water to pass around the venturi structure and join the water emitted from the exit of the venturi structure. For example a bypass channel may be formed by providing an outer discharge tube around the venturi structure and spacing the outer discharge tube from the outer walls of the venturi to provide a throughflow space.

It is possible that under some conditions water in the discharge tube travels backward, i.e., up through the discharge tube and out the entrance into the discharge tube. If this happens, a jet of water containing the diluted chemical can travel upward, cross the air gap, and contact the water jet nozzle at the top of the air gap. Since the water jet nozzle is connected to the source of water supply, it is possible that the chemical can migrate into the water supply.

SUMMARY

The eductor comprises a backflow deflector so that, in the event of backflow, liquid emitted from the discharge tube does not cross the air gap and contact the water jet nozzle above the air gap. The principle of operation differs from a simple air gap in that the back flow path is physically redirected rather than allowed to disperse in all directions.

The backflow deflector acts to laterally deflect backflow outward and away from the body of the eductor and away from the potable water supply, thus minimizing the chance of contamination of the water supply with the backflowing liquid. With the eductor of the present invention, upon the occurrence of backflow the fluid emitted from the top of the discharge tube is deflected laterally so that a jet of liquid is not directed into contact with the water supply nozzle at the top of the air gap.

A first aspect is directed to an air gap eductor comprising an upper assembly, a lower assembly, and a connecting structure connecting the upper assembly and the lower assembly. The upper assembly includes (i) a receptacle for receiving a water supply, and (ii) a water jet nozzle. The lower assembly includes (iii) a discharge tube, (iv) a venturi structure inside the discharge tube, (v) a liquid entrainment side passageway into the venturi structure, and (vi) a backflow deflector between the air gap and an inlet into the venturi structure. The connecting structure connects the upper assembly to the lower assembly, and provides an air gap between the water jet nozzle of the upper assembly and the backflow deflector of the lower assembly. The discharge tube has an upper end, a lower end, and an inside surface surrounding (i.e., defining) a passageway through the discharge tube. The upper end of the discharge tube has a transverse opening comprising an unobstructed water jet receiving portion and a rim portion. The rim portion is between the water jet receiving portion and the inside surface of the passageway through the discharge tube. The water jet receiving portion is aligned to receive a jet of water from the water jet nozzle of the upper assembly. The venturi structure is between the upper end of the discharge tube and the lower end of the discharge tube. The backflow deflector comprises a transverse backflow deflector plate which blocks a first part of the rim portion of the opening at the upper end of the discharge tube. The deflector plate leaves unblocked both the water jet receiving portion of the opening as well as a second part of the rim portion of the opening at the upper end of the discharge tube. The blocked first part of the rim portion is from 40 to 80 percent of the rim area and the unblocked second part of the rim portion is from 20 to 60 percent of the rim area. The blocked first part of the rim portion and the unblocked second part of the rim portion provide a bifurcated asymmetry of from 40% to 100%.

In an embodiment, the blocked first part of the rim portion is from 45 to 75 percent of the rim area, and the unblocked second part of the rim portion is from 55 to 25 percent of the rim area, and the blocked first part of the rim portion and the unblocked second part of the rim portion provide a bifurcated asymmetry of from 50% to 100%.

In an embodiment, the blocked first part of the rim portion is from 50 to 75 percent of the rim area and the unblocked second part of the rim portion is from 50 to 25 percent of the rim area, and the blocked first portion of the rim and the unblocked second portion of the rim provide a bifurcated asymmetry of from 50% to 100%.

In an embodiment, the blocked first part of the rim portion is from 50 to 60 percent of the rim area, and the unblocked second part of the rim portion is from 50 to 40 percent of the rim area, and the blocked first part of the rim portion and the unblocked second part of the rim portion provide a bifurcated asymmetry of from 80% to 100%.

In an embodiment, the backflow deflector is made from a thermoplastic composition, and the backflow deflector is nonporous.

In an embodiment, the water jet receiving portion of the transverse opening at the upper end of the discharge tube is centrally positioned relative to the discharge tube passageway.

In an embodiment, the backflow deflector has a lower surface which is substantially perpendicular to an axis of the discharge tube.

In an embodiment, the backflow deflector has an integral collar having an inside surface that press fits around an outside surface of the discharge tube.

In an embodiment, the backflow deflector has an integral collar having an outside surface that press fits into the inside surface of the discharge tube.

In an embodiment, the backflow deflector has a plurality of integral legs that extend into the inside of the discharge tube.

In an embodiment, the water jet nozzle has a circular orifice for emitting a jet of water having a circular cross-section, the discharge tube has a circular cross section, the water jet receiving portion of the opening at the upper end of the discharge tube is circular, the backflow deflector has an integral circular collar that press fits into the inside surface of the discharge tube, and the backflow deflector has a plurality of integral legs that extend into the inside of the discharge tube.

In an embodiment, the circular orifice on the water jet nozzle has a diameter of from 1.5 to 2.5 millimeters, and the water jet receiving portion of the transverse opening at the upper end of the discharge tube has a diameter of from 4 to 6 millimeters, and the air gap is from 20 to 35 millimeters.

In an embodiment, the air gap is from 25 to 30 millimeters and the blocked portion of the rim is 50 percent of the rim area and the unblocked second portion of the rim is 50 percent of the rim area, with the blocked first portion of the rim and the unblocked second portion of the rim providing a bifurcated asymmetry of 100%.

In an embodiment, the plurality of legs consists of four legs, with three of the legs having lower ends connected by an integral connector, the connector positioned on an opposite side of the backflow deflector from the deflector plate.

In an embodiment, the connector is arcuate and is secured to an inside surface of each of the three legs, and the circular orifice on the water jet nozzle has a diameter of from 1.5 to 2.5 millimeters, the water jet receiving portion has a diameter of from 4 to 6 millimeters, the air gap is from 25 to 30 millimeters, and the blocked portion of the rim is 50 percent of the rim area and the unblocked second portion of the rim is 50 percent of the rim area, with the blocked first portion of the rim and the unblocked second portion of the rim providing a bifurcated asymmetry of 100%.

In an embodiment, the backflow deflector is the only deflector between the venturi structure and the air gap.

In an embodiment, the backflow deflector has a backflow deflector surface that is upwardly sloping away from an inside surface of the discharge tube.

In an embodiment, the eductor further comprises a bypass channel for flow bypassing the venturi structure, with an outer surface of the venturi structure comprising a plurality of spaced grooves extending substantially parallel to the axis of the discharge tube.

In an embodiment, the lower assembly further comprises a flow restrictor. The flow restrictor comprises a flow restrictor plug removably received in a socket in the lower assembly. The flow restrictor plug has a plurality of grooves with each groove having a different cross sectional size. The flow restrictor plug is positioned so that a selected groove of the plurality of grooves is positioned to provide a flow rate corresponding with the cross sectional size of the groove.

DETAILED DESCRIPTION

Figure 1:
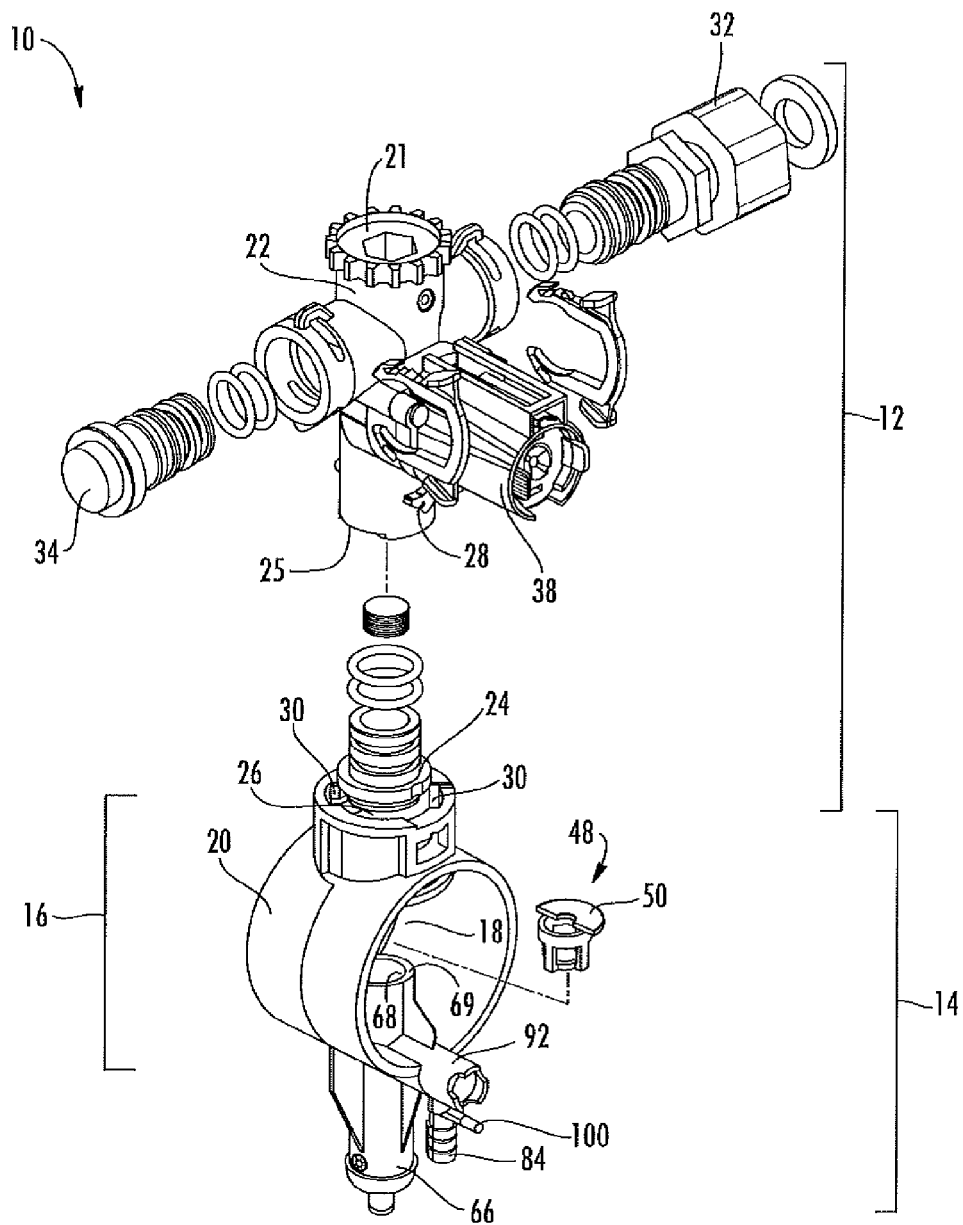
FIG. 1 is an exploded perspective view of an eductor having a backflow deflector.

The design of the backflow deflector allows the jet of water to pass downward through the air gap, pass unobstructed through the backflow deflector (which can be located at the upper end of the discharge tube), pass into and through an upper portion of the passageway through the discharge tube, and contact with the venturi structure. Although the downward passage of the jet of water is unobstructed from the water jet orifice to the venturi structure, in the event of backflow the backflow deflector prevents the backflowing liquid from jetting vertically upward along the same path the water entered from. That is, the backflowing liquid contacts the backflow deflector when it reaches the upper end of the discharge tube, with the backflow deflector altering the path of liquid flow such that the backflowing liquid is deflected laterally in a direction away from the water jet.

The backflow deflector has a transverse deflector plate blocking a portion of the area of the upper end of the passageway through the discharge tube. As used herein, the phrase "the area of the upper end of the passageway through the discharge tube" refers to the actual amount of open transverse cross sectional area within the passageway at the upper end of the discharge tube. More particularly, if the backflow deflector has a collar which extends from the deflector plate into the passageway through the discharge tube, with the collar blocking a portion of the cross sectional area, then the area of the upper end of the passageway through the discharge tube includes the area inside the collar, but does not include that portion of the cross sectional area of the passageway through the discharge tube which is blocked by the collar. If the deflector plate has no collar but has one or more legs which fit inside of the discharge tube, then the area of the upper end of the passageway through the discharge tube is the transverse cross sectional area of the opening at the top of the discharge tube, less the cross sectional area of the leg(s) extending into the discharge tube. If the backflow deflector has a collar that fits onto the outside of the discharge tube, with no portion of the backflow deflector extending inside the passageway through the discharge tube, the area of the upper end of the passageway through the discharge tube is the cross sectional area of the opening at the top of the discharge tube.

As used herein, the phrase "transverse deflector plate" refers to the fact that the deflector plate extends across the opening at the upper end of the discharge tube. It is the lower surface of the deflector plate which deflects the backflowing liquid. Although the lower surface of the deflector plate may be directly transverse (i.e., 90°) to the passageway though the discharge tube, it need not be directly transverse. An additional advantage in backflow deflection may be gained by upwardly inclining the lower surface of the deflection plate from the outer wall of the bypass channel towards the center of the passageway through the discharge tube. If the deflection plate is inclined in this manner, the incline angle of the lower surface of the deflector plate depends upon the geometry of the venturi structure and the geometry of the bypass channel, but may be angled from 45° to 90° with respect to the axis of the passageway (i.e., the flow through direction), or from 55° to 90° with respect to the flow through direction, or from 65° to 90° with respect to the through flow direction, or from 70° to 90° with respect to the through flow direction, or from 75° to 90° with respect to the through flow direction, or from 80° to 90° with respect to the through flow direction, or from 85° to 90° with respect to the through flow direction.

The opening into a passageway through the discharge tube includes two portions, i.e., two areas which together sum to the area of the upper end of the passageway through the discharge tube. The first portion is a water jet receiving portion, i.e., that portion of the opening which is unblocked (i.e., unobstructed) and is sized, shaped, and located in a position to receive the jet of water emitted from the water nozzle above the air gap. The second portion is a rim portion, i.e., that portion of the opening between the water jet receiving portion and the outer perimeter of the upper end of the passageway through the discharge tube. As in FIG. 8C, the water jet receiving portion may be centrally located within the opening at the upper end of the discharge tube, with the rim surrounding the water jet receiving portion.

As used herein, the phrase "rim area" refers to the total area of the rim portion of the area of the upper end of the passageway through the discharge tube. As used herein, the rim area is the sum of the "blocked part of the rim" and the "unblocked part of the rim." For example, viewing FIG. 1 and FIG. 8C, and substituting backflow deflector 102 for backflow deflector 48 illustrated in FIG. 1, backflow deflector 102 has collar D having outer surface 106 shaped and sized to press fit into transverse opening 68 at upper end 69 of discharge tube 66 on eductor 10.

Figure 8A:
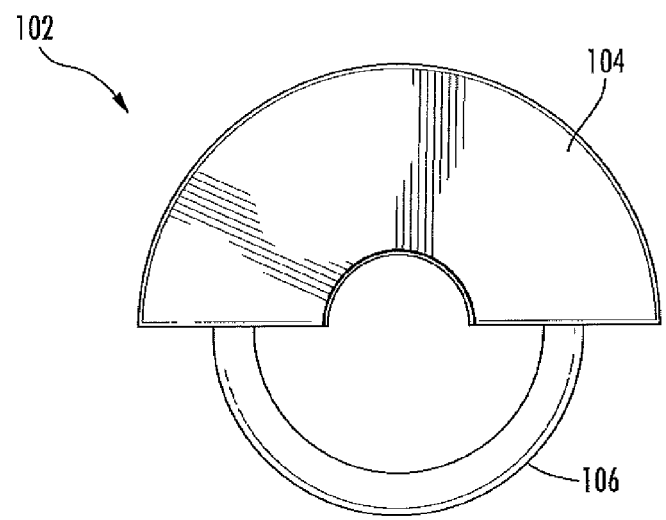
FIG. 8A is top view of another embodiment of a backflow deflector.

Viewing FIGS. 1 and 8A together, since backflow deflector 102 can fit immediately over the upper end of the passageway through the discharge tube 66, various areas on backflow deflector 102 are directly above, correspond with, and define the water jet receiving portion and the rim portion of the transverse area across the top of the passageway through the discharge tube. The area of the upper end of the passageway through the discharge tube is, effectively, the sum of Areas A, B, and C in FIG. 8C. Area D is blocked by collar 106, so it is eliminated from inclusion as a portion of the area of the upper end of the passageway through the discharge tube. Area A corresponds with the water jet receiving portion of the area of the upper end of the passageway through the discharge tube. Area B corresponds with the unblocked part of the rim portion of the upper end of the passageway through the discharge tube. Area C corresponds with the blocked part of the rim portion of the upper end of the passageway through the discharge tube.

In one embodiment, area A is about 25% of the area of the upper end of the passageway through the discharge tube, with the rim area (B+C) being about 75% of the area of the upper end of the passageway through the discharge tube. The area A can be from 10% to 45% (or from 15 to 40%, or from 20 to 35%, or from 20 to 30%) of the area of the upper end of the passageway through the discharge tube, with the rim area being from 55% to 90% (or from 60 to 85%, or from 65 to 80%, or from 70 to 80%) of the area of the upper end of the passageway through the discharge tube.

In order that the backflow deflector laterally deflect backflowing liquid to prevent the backflowing liquid from jetting upward out of discharge tube 66 across the air gap and contacting the opening in the water jet nozzle, the backflow deflector is designed to provide bifurcated asymmetry. As used herein, the phrase "bifurcated asymmetry" is determined by (i) determining a center point of the passageway through the discharge tube without the backflow deflector in place (ii) installing the backflow deflector, (iii) finding a straight bifurcation line through the center point, which line divides the cross section of the passageway into two regions in a manner that maximizes the blocked portion of the rim area of the passageway on a first side of the line and minimizes the blocked portion of the rim area on a second side of the line, (iv) determining the percent rim area blocked on the first side of the line, (v) determining the percent rim area blocked on the second side of the line, and (vi) calculating the percent bifurcated asymmetry by taking the absolute value of the difference of the percent rim area blocked on the first side of the line and the percent rim area blocked on the second side of the line.

For example, if 100% of the rim area is blocked on one side of the bifurcation line and 0% of the rim area is blocked on the other side of the bifurcation line (see the working example of FIGS. 8A, 8B, and 8C), then the % bifurcated asymmetry is 100%−0% 100%. In another embodiment, if 100% of the rim area is blocked on one side of the bifurcation line and 50% of the rim area is blocked on the other side of the bifurcation line (e.g., if the deflector plate is enlarged to extend 270 degrees around the water jet receiving portion of the area of the upper end of the passageway through the discharge tube), then the % bifurcated asymmetry is 100% minus 50%=50%. In another embodiment, if 80% of the rim area is blocked on one side of the bifurcation line and 0% of the rim area is blocked on the other side of the bifurcation line, then the % bifurcated asymmetry is 80% minus 0%=80%.

In another embodiment, if 100% of the rim area is blocked on one side of the bifurcation line and 100% of the rim area is blocked on the other side of the bifurcation line (see the comparative example of FIGS. 9A and 9B), then the % bifurcated asymmetry is 100% minus 100%=0%. In another embodiment, if 40% of the rim area is blocked on one side of the bifurcation line and 40% of the rim area is blocked on the other side of the bifurcation line (see comparative example of FIG. 10), then the % bifurcated asymmetry is 40% minus 40%=0%.

Similarly, if 80% of the rim area is blocked in a single, continuous area, the bifurcated asymmetry ("BA") is 40% because there is blockage of 100% of the rim on the first side of the line but only 60% blockage of the rim on the second side of the line, for a BA of 100%–60%=40%. Similarly, if 75% of the rim area is blocked in this manner, the BA is 50%; if 70% of the rim area is blocked in this manner, the BA is 60%; if 65% of the rim area is blocked in this manner, the BA is 70%; if 60% of the rim area is blocked in this manner, the BA is 80%; if 55% of the rim area is blocked in this manner, the BA is 90%; and if 50% of the rim area is blocked in this manner, the BA is 100%; if 45% of the rim area is blocked in this manner, the BA is 90%; and if 40% of the rim area is blocked in this manner, the BA is 80%.

Operable backflow deflection can be obtained with a bifurcated asymmetry of from 40% to 100%, or from 45% to 100%, or from 50% to 100%, or from 55% to 100%, or from 60% to 100%, or from 65% to 100%, or from 70% to 100%, or from 75% to 100%, or from 80% to 100%, or from 85% to 100%, or from 90% to 100%, or from 95% to 100%.

Viewing FIGS. 1, 2, 3A, 3B, 3C, and 4 together, an air-gap type eductor 10 is illustrated, including upper assembly 12 and lower assembly 14, with connecting structure 16 being molded integrally with lower assembly 14. Eductor 10 is formed primarily of molded plastic components. Air gap 18 is provided inside connecting structure 16 which is in the form of open-ended cylinder 20 which is oriented so as to have a horizontal central axis therethrough. The horizontal central axis through cylinder 20 is perpendicular to the longitudinal axis through the upper assembly 12 and lower assembly 14 of eductor 10. Lower assembly 14 and connecting structure 16 are molded as a single integral unit with discharge tube 66 of lower assembly 14 being integral with and extending into connecting structure 16. Upper assembly 12 has a separate molded body 22.

Body 22 of upper assembly 12 has lower end 25 which fits into upper receptacle 26 in lower assembly 14. Integral pins 28, extending radially outward from body 22 of upper assembly 12, fit into and lock within channels 30 (FIG. 1) in upper receptacle 26 of lower assembly 14, thereby releasably locking upper assembly 12 into position over lower assembly 14. Eductor 10 is designed so that in use, upper assembly 12 is positioned above lower assembly 14.

Figure 2:
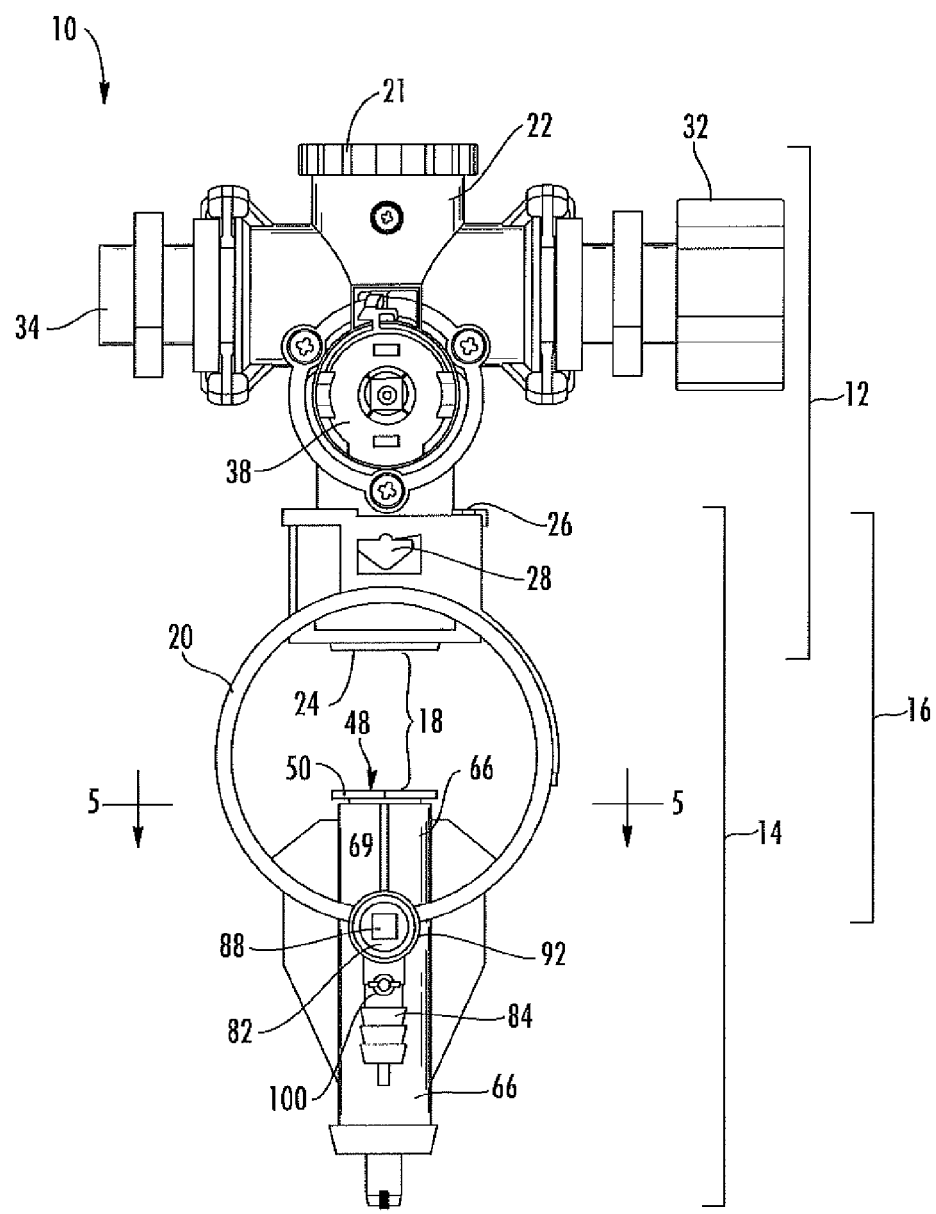
FIG. 2 is a front view of the eductor of FIG. 1, assembled.

Upper assembly 12 has internally threaded water supply connector 32 for receiving a water supply hose (not illustrated), which in turn can be connected to a source of water (not illustrated). Water from a supply of pressurized water passes through the passageway within connector 32 and into and through body 22 of upper assembly 12, including passing by accessory plug 34 which can be blanked off if not in use (i.e., as illustrated in FIGS. 1 and 2) or used to string the eductor to one or more similar eductors for metering other solutions, or used as an alternate source of connection to the water source. The water passes through strainer or filter 36 (see FIGS. 3A and 4), which can be made of metal mesh or plastic mesh positioned in a recess in the top of eductor body 22, accessible via removable plug 21 for cleaning or replacement.

Figure 3A:
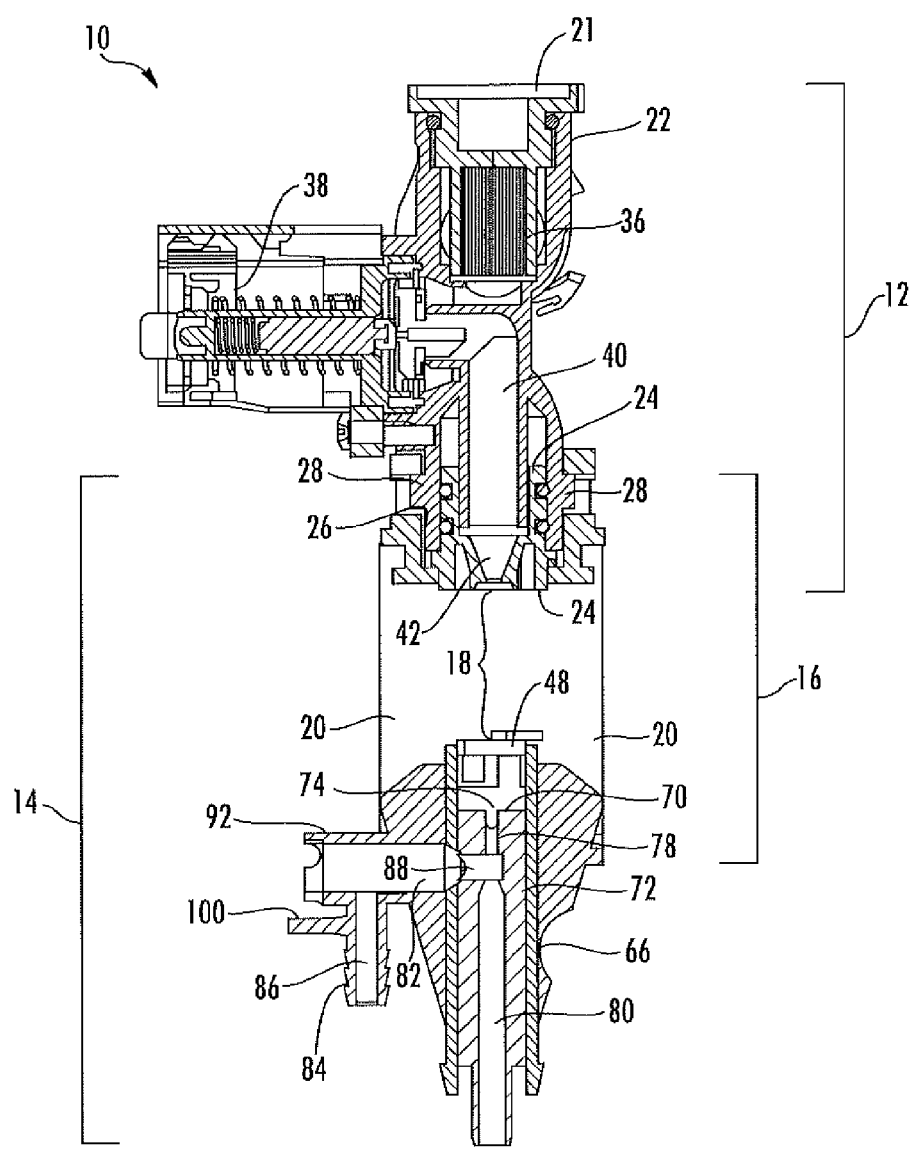
FIG. 3A is a longitudinal front-to-back cross-sectional view of the assembled eductor of FIGS. 1 and 2.
Figure 4:
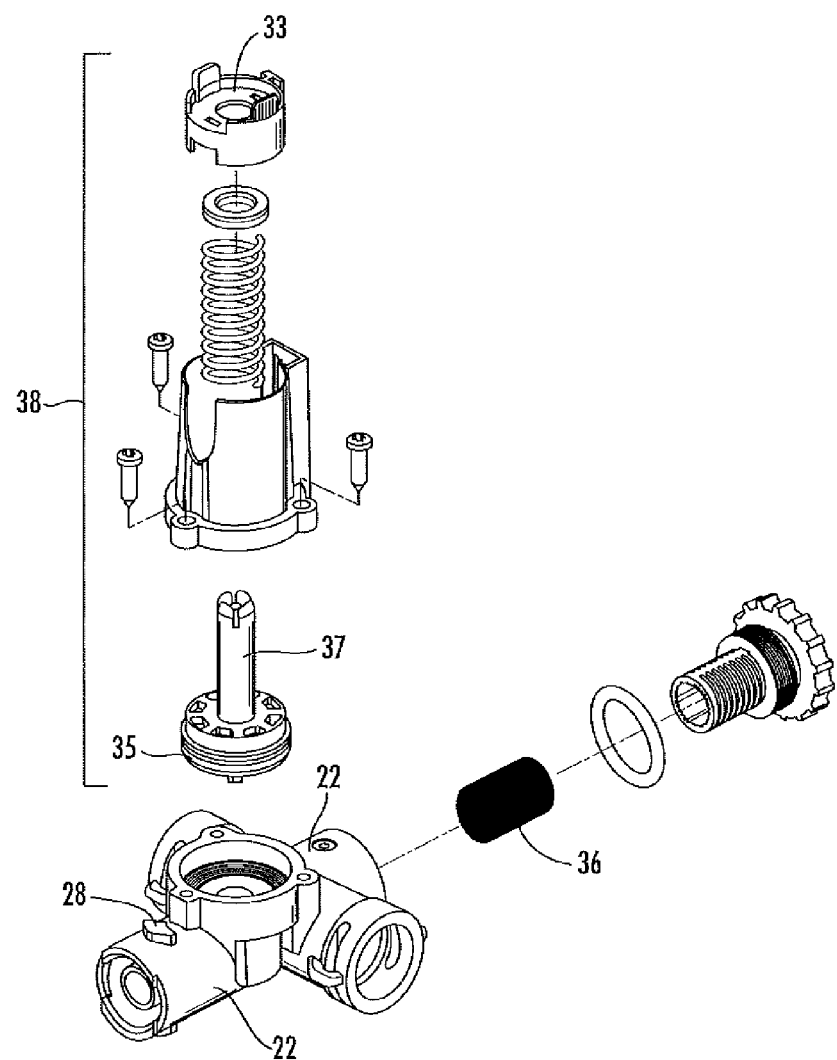
FIG. 4 is an exploded view of the upper section of the eductor illustrated in FIGS. 1, 2, 3A, and 3B.

After passing filter 36, the water passes through valve assembly 38. The various components of valve assembly 38 are illustrated in FIG. 4. Valve assembly 38 is a magnetically operated diaphragm valve having a non-rusting magnetically attracted steel core body 37 carrying a diaphragm 35 which is movable by means of external magnet 33 in order to open a flow passage leading to central passageway 40 (FIG. 3A), which is the main axial passageway through upper assembly 12 of eductor 10. Valve assembly 38 need not be a magnetically operated diaphragm valve but could be any suitable alternative valve arrangement, such as a ball valve or electrically operated valve, as the valve function is simply to open and close the flow of liquid flow through eductor 10.

After passing through the opening provided by valve assembly 38, the water flows downward through central passageway 40 (FIG. 3A) and then into, through, and out of water jet nozzle 42 (FIG. 3A), which can be of conventional construction, and which is fitted within lower end 25 of upper assembly 12. As stated above, lower assembly 14 has upper receptacle 26 for receiving the lower end 25 of upper assembly 12. The resulting assembled eductor 10 is as illustrated in FIGS. 2 and 3A, i.e., with a single longitudinal axis through the center of aligned upper assembly 12 and through the center of lower assembly 14. As a result, the jet of water emitted from water jet nozzle 42 (FIG. 3A) travels downward through air gap 18, at which the eductor body is open at both front and rear to the exterior air. The jet of water passes into and through the center of transverse opening 68 (FIG. 1) in the upper end of discharge tube 66. Immediately before passing through the center of transverse opening 68, the jet of water passes by deflector plate 50 of backflow deflector 48. Backflow deflector 48 is press fitted into the inside of discharge tube 66. During passage by deflector plate 50, the jet of water is not obstructed by deflector plate 50. Thereafter, the jet of water passes through the remainder of backflow deflector 48.

Figure 7A:
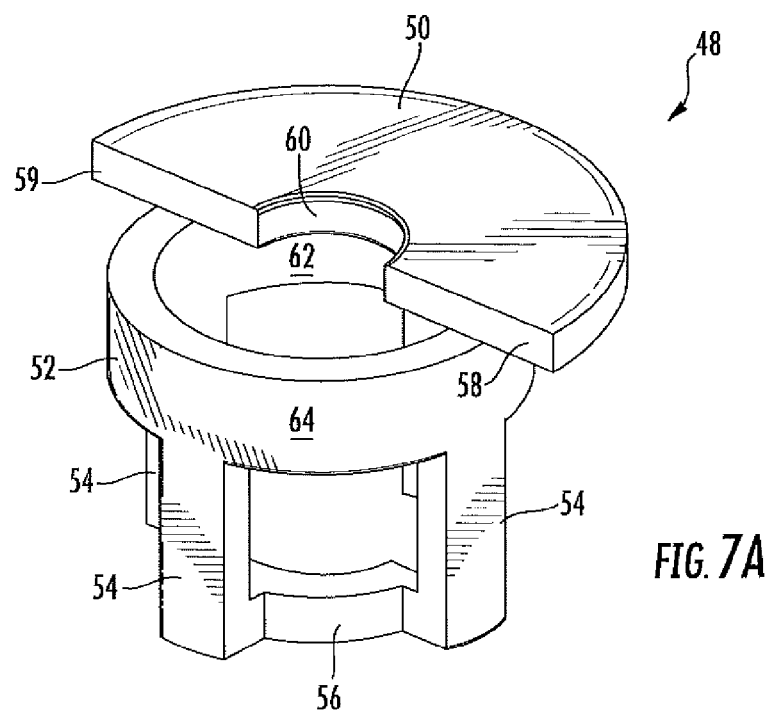
FIG. 7A is a perspective view of a backflow deflector for use in the eductor of FIGS. 1-4.
Figure 7B:
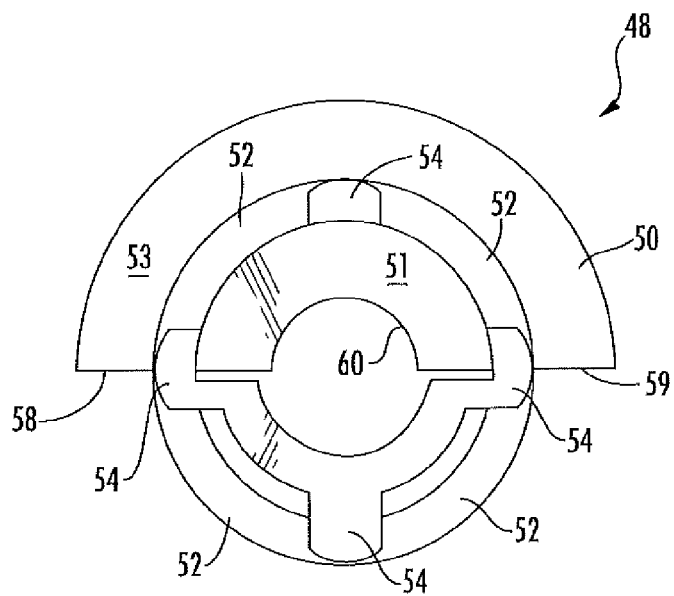
FIG. 7B is a view from below of the backflow deflector of FIG. 7A.

FIGS. 7A and 7B illustrate backflow deflector 48, which is also shown in the exploded view of FIG. 1. In addition, backflow deflector 48 is shown in position in FIGS. 2, 3A, and 3B. Backflow deflector 48 may be integrally molded as one piece, and may be made from plastic, such as polyethylene, polypropylene, polyamide, etc. In FIG. 1, during installation backflow deflector is to be rotated 90 degrees counterclockwise (or 90 degrees clockwise) when inserted into the passageway through discharge tube 66, so that deflector plate 50 is positioned in the back, i.e., so that the opening in the top of deflector plate faces toward the open front end (or the open back end) of cylindrical connecting member 20. In this manner, in the event of backflow, the backflowing liquid emitted from the top opening in backflow deflector 48 is deflected laterally out of educator 10 rather than towards water jet nozzle 42.

Viewing FIGS. 7A and 7B, backflow deflector 48 has deflector plate 50, collar 52, legs 54, and leg connector member 56. Deflector plate 50 has straight edge sections 58 and 59 which extend along a line defining a diameter across the passageway through collar 52, i.e., the passageway defined by inside surface 62 of collar 52. Deflector plate 50 has curved edge 60 which is centrally positioned and which leaves unobstructed the entire water jet receiving portion of transverse opening 68 at the top of discharge tube 66. The water jet receiving portion of transverse opening 68 receives the water jet stream which is emitted from water jet nozzle 42. The water jet can be positioned and aligned to deliver the jet of water centered along the longitudinal axis through eductor 10.

During normal operation, the jet of water flows downward through air gap 18, past backflow deflector 48, and into and through discharge tube 66. More particularly, the jet of water (not illustrated) emitted from water jet nozzle 42 passes vertically downwards across air gap 18, traveling past arcuate edge 60 of deflector plate 50 of backflow deflector 48, into an upper end 69 of discharge tube 66 by passing through the transverse opening 68 (FIG. 1) at the top of discharge tube 66.

Figure 5:
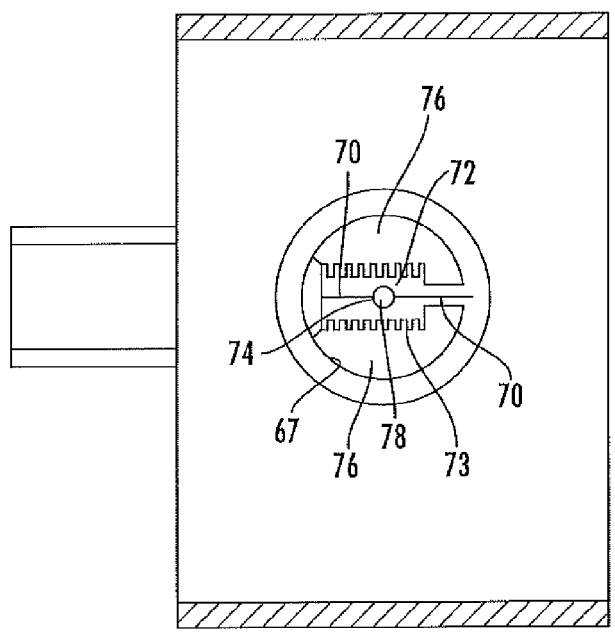
FIG. 5 is a top view of the eductor of FIGS. 1, 2, 3A, and 3B, taken through section 5-5 of FIG. 2, with the backflow deflector removed.

After the jet of water passes backflow deflector 48, the jet of water contacts upper knife-like edge 70 of venturi structure 72 mounted within and extending diametrically across the passageway through discharge tube 66. See FIGS. 3A, 3B, and 5. Venturi structure 72 has bypass channels 76 on each side thereof. See FIG. 5. Knife-like edge 70 minimizes splash-back of liquid from the jet of water impacting venturi structure 72. Bypass channels 76 are defined by the outer wall of venturi structure 72 and the inner wall 67 of discharge tube 66. Venturi structure 72 has inlet 74 positioned at the center of the passageway through discharge tube 66, with inlet 74 being along knife-like ridge 70 at the top of venturi structure 72.

The interior of venturi structure 72 is conventional, and includes an upper narrow passageway 78 which flares into wider passageway 80. Narrow passageway 78 can be of constant width or may narrow slightly in cross sectional area at its downstream end. At the downstream end of narrow passageway 78 is mixing chamber 88. Side passage 82 is connected to mixing chamber 88. Downstream of mixing chamber 88 is wide passageway 80, which is of uniform cross-sectional area. Wide passageway 80 opens at the lower end of eductor 10, where the liquid can be directed into a receiving container, or a connection made to a tube or pipe, as desired.

The second liquid, which contains the concentrated active ingredient, is supplied from a source (not illustrated) which is connected via hose or other means to inlet connector 84 providing inlet passageway 86 for the second liquid into side passageway 82. The axial direction of the connector 84 is parallel to passageways 78 and 80, so that a pipe or hose connecting to connector 84 does not project laterally, thus minimizing the space required for eductor 10 and reducing the risk of accidental disconnection from the connector 84.

The second liquid is entrained into and diluted by the flow of water from that portion of the jet of water which flows into narrow passageway 78 and into mixing chamber 88, which flow of water (having mixed with the second liquid in mixing chamber 88) flows downward into wider passageway 80 through venturi structure 72. That portion of the jet of water which passes through venturi structure 72, upon being emitted from the bottom end of wide passageway 80 of venturi structure 72, rejoins that portion of the jet of water which passes venturi structure 72 via bypass channels 76.

A diluted mixed solution leaves the bottom of eductor 10. The bottom of eductor 10 is typically connected to a dispensing hose (not illustrated) for dispensing the dilute mixed solution. In the event that a dispensing hose containing the dilute mixed solution is elevated above the eductor or otherwise becomes pressurized, backflow of the dilute mixed solution can occur. The backflowing mixed solution has the potential to jet upward out of the upper end of discharge tube 46 and across the air gap and into the water jet nozzle, with potential to contaminate the water supply.

Figure 6A:
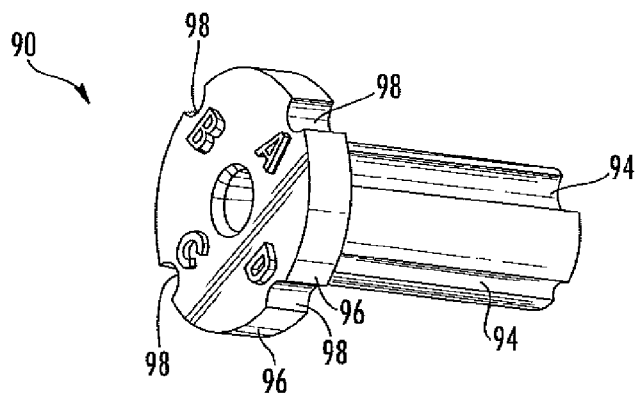
FIG. 6A is a perspective view of a restrictor plug, taken from the front end.
Figure 6B:
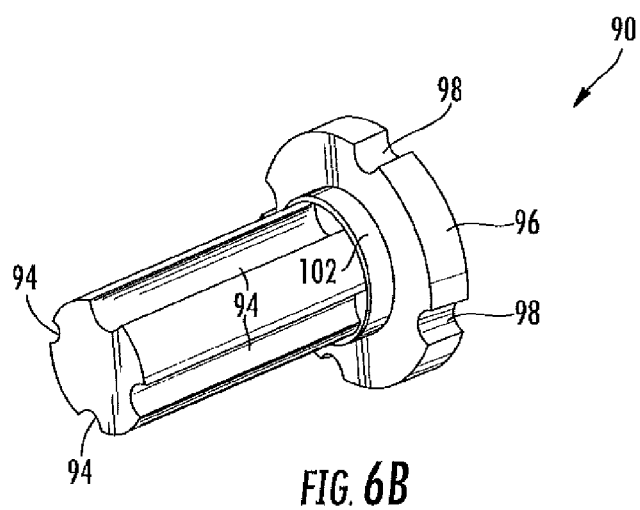
FIG. 6B is a perspective view of the restrictor plug of FIG. 6A, taken from the back end.

The surface forming side passageway 82 also serves as a socket for accepting flow restrictor plug 90, illustrated in FIGS. 6A and 6B. Flow restrictor plug 90 has a cylindrical peripheral surface and is received by push-fitting into the socket formed by side passageway 82. That is, the socket is formed by the inside surface of projecting portion 92 of lower assembly 14.

The cylindrical surface of restrictor plug 90 has four axially extending grooves 94 spaced apart 90 degrees around its circumference. Alternatively, the grooves 94 may be helical and uniformly spaced around the periphery of restrictor plug 90. A number of grooves 94 other than four may be provided, as appropriate.

Restrictor plug 90 has circumferential flange 96 which projects radially from the cylindrical surface and has four locating grooves 98 which selectively locate on projecting pin 100, in order to orient plug 90 in any one of four selectable positions. In each of these four positions, one of the axial grooves 94 is aligned with the upper end of the flow passageway 86 (FIGS. 3A and 3B) of connector 84. Axial groove 94 connects flow passage 86 inside connector 84 to side passage 82 and defines, together with the surface defining side passage 82, a narrow flow-restricting path for the second liquid, thereby controlling the rate at which the second liquid passes into mixing chamber 88. By making axial grooves 94 of respectively different sizes (either in depth or width or both), plug 90 provides four different flow-restriction rates for the second liquid, selectable by removing plug 90 and reinserting it at a different position. As illustrated in FIG. 6A, the flange may contain a designation corresponding to the size of groove 94. Plug 90 is a tight enough fit in the socket to seal the flow of the second liquid except at the selected groove 94, but sufficiently loose to be easily removable for replacement, cleaning, or selection of the rotational position in which it is inserted. Leakage to the exterior is prevented by a push-fit seal at enlarged diameter portion 102 next to flange 96.

Plug 90 is advantageous not only because of the selectability of the different grooves 94, but also because each small cross-section groove 94 is easily cleaned if there is any blockage due to a solid particle in the second liquid or due to any accumulation of dirt. As the cleaning operation is not likely to damage grooves 94 or affect their shape, the risk of inadvertent alteration of the flow restriction is avoided. The grooves 94 can be precisely produced by injection molding.

The exterior of venturi structure 72 has on both exterior sides a series of parallel vertical grooves 73 extending from a lower part of its top wedge portion to its bottom. Grooves 73 are narrower in width than depth, and face bypass channels 76. An advantage of grooves 73 is that a reduction in back filling of the bypass channel, which can result in backflow upward to and past the top of discharge tube 66. This advantage of grooves 73 can be achieved without changing the size or geometry of the eductor casing or outer discharge tube, i.e. without increasing the size of the bypass channel. The presence of grooves 73 has the effect of increasing the adhesion of water to the outer surface of the venturi structure, thereby directing water away from the outer walls of the bypass channel and encouraging direct throughflow in the bypass channel. This improves the efficiency of the bypass channel and increases the flaw rate of water which can be accommodated. It is advantageous to direct the water away from the outer walls of the bypass filter because this can cause back filling of the bypass channel, as discussed above.

Figure 3B:
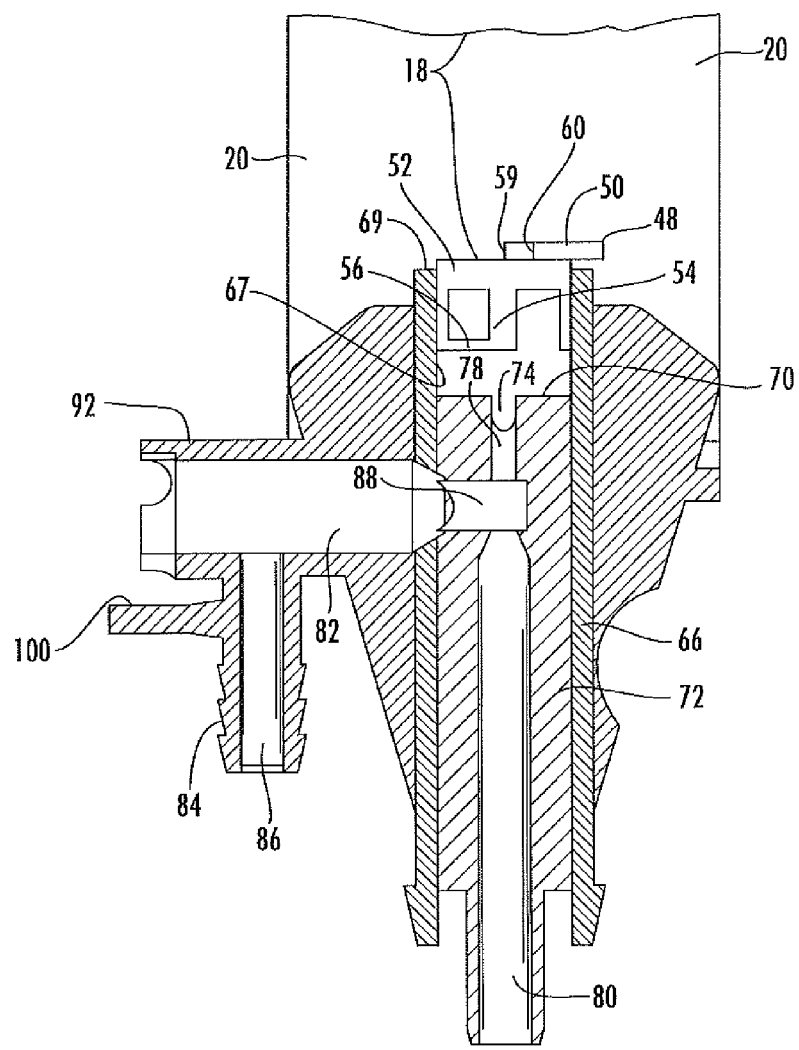
FIG. 3B is an enlarged view of the lower assembly of the longitudinal front-to-back cross-sectional view of the assembled eductor of FIG. 3A.
Figure 3C:
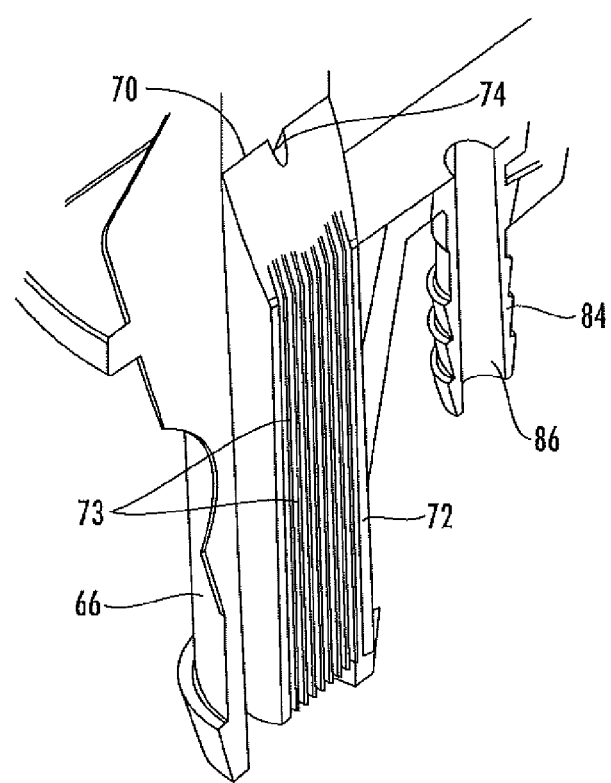
FIG. 3C is a cutaway perspective view of a portion of an eductor, showing the venturi structure.

FIG. 3C illustrates a cutaway perspective view of discharge tube 66 having mounted therein venturi structure 72. Venturi structure 72 is illustrated in a lower assembly slightly different from lower assembly 14 illustrated in FIGS. 1, 2, 3A and 3B. However, venturi structure 72 in FIG. 3C has features present in venturi structure 72 in FIG. 5, including knife-like upper edge 70 having venturi inlet 74, and rectangular grooves 73 facing bypass channels 76.

The eductor described herein may be mounted in a dispensing apparatus, such as the apparatus shown in EP-A-726874, which is hereby incorporated, in its entirety, by reference thereto.

During backflow, liquid flows upward through discharge tube 66. Backflow can occur for a variety of reasons. If a flexible hose is connected to the bottom of discharge tube 66, and the flexible hose is full of liquid and is lifted up high enough to produce a hydrostatic head of liquid above the top of discharge tube 66, backflow can occur. During severe backflow, liquid can flow upward through the full length of discharge tube 66 and out through the opening at the top of backflow deflector 48. During this upward flow through the passageway within discharge tube 66, a relatively small fraction of the backflowing liquid passes through venturi structure 72, limited by narrow passageway 78. A majority of the liquid passes through bypass channels 76.

After backflowing liquid passes above the top edge 70 of venturi structure 72, it thereafter encounters backflow deflector 48. If backflow deflector 48 is installed in place at the top end of discharge tube 72, the backflowing liquid first encounters connector member 56 and the bottom of each of legs 54. Connector member 56 together with the three legs 54 to which connector member 54 is joined, together force a shift of the upflowing fluid towards the other side of the passageway through discharge tube 66, i.e., towards bottom surface 51 of deflector plate 51. See FIG. 7B. Positioning connector member 56 on the opposite side of backflow deflector 48 relative to deflector plate 50 causes the backflowing stream of liquid to be deflected transversely across the middle of the discharge tube passageway and toward the underside of deflector plate 50. This transverse movement of backflowing liquid reduces the upward central thrust of backflowing liquid toward the water jet nozzle, and enhances the lateral flow direction of the backflow liquid out through the unblocked portion of the upper end of the discharge tube. The relatively high pressure against bottom surface 51 causes the backflowing fluid to move laterally across the bottom surface 51, towards the opening at the top of backflow deflector 48. The lateral movement of the fluid from underneath bottom surface 51 prevents a jet of backflow fluid from being emitted vertically upward into contact with water jet nozzle 42.

In this manner, backflow deflector 48 causes the backflowing liquid to be deflected laterally out the open end connector member 20, without the backflowing liquid jetting upward into contact with water jet nozzle 42, thereby assuring that the water supply is not contaminated by one or more active components in the backflowing liquid. As stated above regarding turning backflow deflector 48 ninety degrees counterclockwise when installing backflow deflector 48 in transverse opening 68 of discharge tube 66, backflow deflector is then in a position so that plate 50 is in the "back" of the eductor 10, with the opening at the top of backflow deflector 48 oriented so as to direct the stream of backflow liquid out the open end of the cylinder of connecting member 20, i.e., towards projecting portion 92.

The lower surface 51 of deflector plate 50 may be horizontal. That is, as illustrated in FIGS. 1, 2, 3A, 3B, 7A, 7B, 8A, and 8B, lower surface 51 is perpendicular to the upward direction of water flow during the occurrence of backflow. However, an additional advantage may be gained when the lower surface facing the inlet to the bypass channel is inclined upwardly from the outer wall of the bypass channel towards the center of the passageway through discharge tube 72. The incline angle of the lower surface depends upon the geometry of the venturi and the bypass channel, but may be up to about 75° with respect to the through flow direction, or up to about 65° with respect to the through flow direction, up to about 55° with respect to the through flow direction, up to about 50° with respect to the through flow direction, or up to about 45° with respect to the through flow direction.

Backflow deflector 48 illustrated in FIGS. 1, 2, 3A, 3B, 7A, and 7B is one embodiment of a backflow deflector for use in the eductor. Viewing FIGS. 2 and 7B, outside of collar 52, bottom surface 53 of the underside of deflector plate 50 contacts upper end 69 of discharge tube 66, but does not contact the liquid stream in the event of backflow. Rather, it is bottom surface 51 of deflector plate 50 inside collar 52 which contacts backflowing liquid in the event of backflow. Collar 54 is shaped and sized so that outer surface 64 of collar 52 press fits firmly into the inside surface of discharge tube 66. In this manner, the press-fitting of backflow deflector 48 prevents backflow deflector 48 from being blown upward and out of its backflow deflection position by the reverse flow of liquid during a backflow event. Although backflow deflector 48 is designed to press fit into the inside surface of discharge tube 66 tight enough that backflow deflector 48 is not dislodged by a backflowing stream of liquid, the press fit is not so tight that backflow deflector cannot be manually removed from its press fit engagement to the inside of discharge tube 66.

Figure 8B:
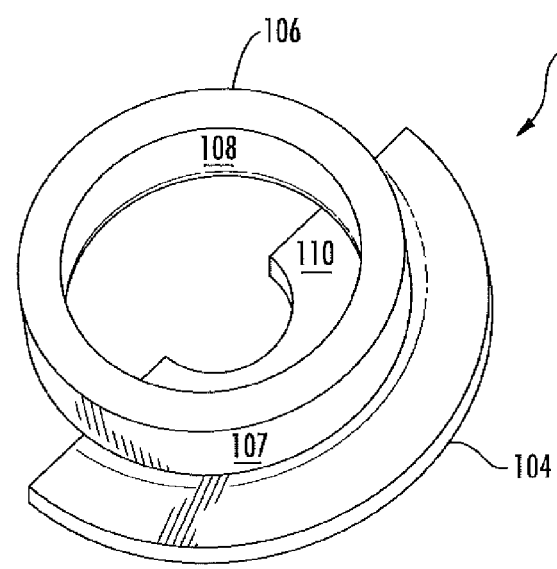
FIG. 8B is a perspective view of the backflow deflector of FIG. 8A, from the underside of the deflector.
Figure 8C:
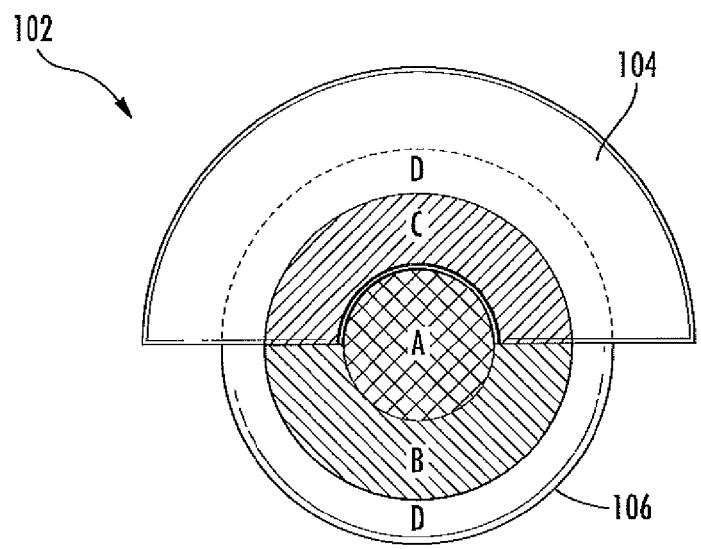
FIG. 8C is a top view of the backflow deflector of FIGS. 8A and 8B, but with designated areas corresponding to portions of the opening at the top of the discharge tube.

FIGS. 8A and 8B illustrate alternative backflow deflector 102, with FIG. 8A being a top view and FIG. 8B being a bottom view. Backflow deflector 102 has deflector plate 104 and collar 106. As illustrated in FIGS. 8A and 8B, collar 106 has outer surface 107 sized to press fit into the inside surface defining the passageway through discharge tube 66. Deflector plate 104 has bottom surface 110 which serves to deflect backflowing liquid coming up through discharge tube 66. Experiments have shown that backflow deflector 102 is operable in eductor as otherwise illustrated in FIGS. 1, 2, 3A, 3B, and 4.

Alternatively, backflow deflector 102 could be designed with a larger collar so that inside surface 108 of collar 106 is sized to press fit over the outside surface of the upper end 69 of discharge tube 66.

Example 1

Working

Backflow deflector 48 illustrated in FIGS. 1, 3A, 3B, 7A, was installed in an eductor system as illustrated in FIGS. 1, 2, 3A and 3B, and tested and found to be capable of deflecting a backflow stream so that it did not jet across the air gap to the water jet nozzle of the upper assembly. Testing of the embodiment of backflow deflector 48 revealed that upon by applying a pressure of 4.35 psi to the dispensing hose, after a period of 5 minutes of backflow at this pressure, no backflowing liquid emerged from water supply connector 32 of eductor 10 of FIGS. 1, 2, 3A, 3B, 4, and 5. Rather, the backflowing liquid was deflected out the front opening of the eductor system having backflow deflector 48 installed therein.

Example 2

Working

Backflow deflector 102 of FIGS. 8A and 8B was also installed in an eductor system as illustrated in FIGS. 1, 2, and 3, and tested and found to be capable of deflecting a backflow stream so that it did not jet across the air gap to the water jet nozzle of the upper assembly. Testing of the embodiment of backflow deflector 102 reveals that upon by applying a pressure of 4.35 psi to the dispensing hose, after a period of 5 minutes of backflow at this pressure, no backflowing liquid emerged from water supply connector 32 of eductor 10 of FIGS. 1, 2, 3A, 3B, 4, and 5. Rather, the backflowing liquid was deflected out the front opening of the eductor system having backflow deflector 102 installed therein.

Example 3

Comparative

Figure 9A:
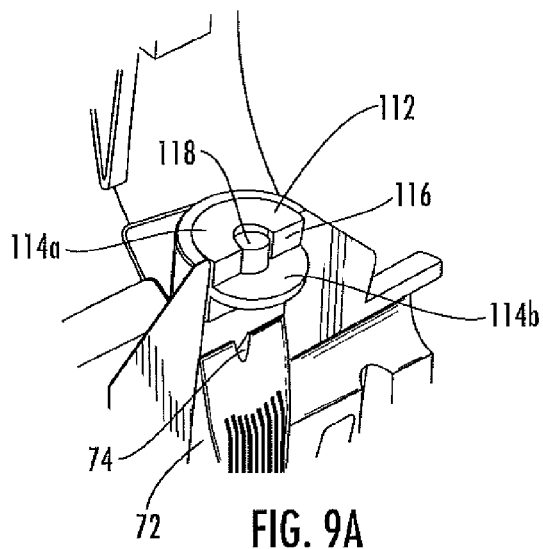
FIG. 9A is a perspective cut-away view of a portion of a prior art eductor system.
Figure 9B:
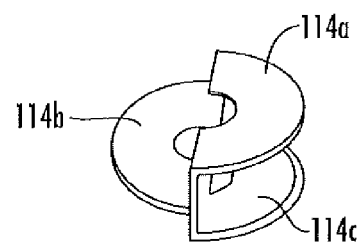
FIG. 9B is a perspective view of the backflow deflector used in the prior art eductor system of FIG. 9A.

Viewed together, FIGS. 9A and 9B pertain to a prior art eductor disclosed in US 2006/0032543. This prior art eductor has spray guard 112 above venturi structure 72 which comprises a molded plastic body having three offset baffles 114a, 114b, and 114c. Each of offset baffles 114a, 114b, and 114c is vertically spaced from the others, as illustrated in the perspective view of FIG. 9B. Each of baffles 114a, 114b, and 114c are positioned horizontally, transverse to the direction of the jet of water (not illustrated) from the water jet nozzle (not illustrated). Each of baffles 114a, 114b, and 114c has a cut out at its axis. Each of baffles 114a, 114b, and 114c extends inwardly from an inside wall of the discharge tube to a diametrical vertical plane at which baffles 114a, 114b, and 114c are joined by vertical wall 116. The three offset, or staggered, semicircular members cover the entire cross section of the outer discharge tube 4, except at straight central path 118 extending axially through spray guard 112 for the water jet.

Although the lower surfaces of each of baffles 114a, 114b, and 114c collect spray and mist generated at the venturi inlet 74 and redirect it back down into outer discharge tube 4, away from the air gap 2, testing of the embodiment of FIGS. 9A and 9B in the manner described in Example 1 (working), resulted in a backflow jet of liquid shooting vertically upward through spray guard 112, through the air gap. Within a period of 5 minutes or less, the backflowing liquid ultimately emerged from water supply connector 32 of eductor 10 of FIGS. 1, 2, 3A, 3B, 4, and 5.

Example 4

Comparative

Figure 10:
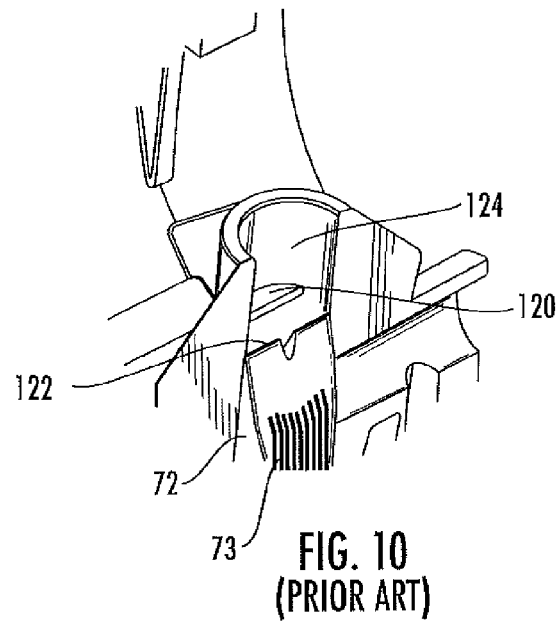
FIG. 10 is a perspective cut-away view of a portion of another prior art eductor system.

FIG. 10 is a perspective cut away view of another prior art eductor disclosed in US 2006/0032543. In the embodiment of FIG. 10, sector-shaped horizontal shelves or ledges 120 extend from inner wall 124, directly above each bypass channel 122 of the discharge tube. Although only one ledge 120 is shown, the complete device contained a second ledge identical 120 (which is not shown because it is in the portion cut away) directly across from ledge 120 illustrated in FIG. 10. The cutaway perspective view of FIG. 10 also illustrates only one bypass channel. Similarly, a second bypass channel is not shown in FIG. 10, but is between grooves 73 and the cut away portion of the wall of the discharge tube.

Ledges 120 were integrally molded with and extended from inner wall 124 of the discharge tube. Ledges 120 each extended part way to the vertical mid-plane of the passageway through the discharge tube, and in use both ledges 120 were provided for the purpose of deflecting backflowing liquid.

Testing of an eductor system having a discharge tube containing a pair of identical integral ledges 120 as illustrated in FIG. 10, the eductor system being otherwise similar to eductor system 10 of FIG. 1, results in a backflow jet of liquid shooting vertically upward through spray guard 112, through the air gap. Within a period of 5 minutes or less, the backflowing liquid ultimately emerges from the water supply connector 32.

What is claimed is:
1. An air gap eductor comprising:
 (A) an upper assembly including
  (i) a receptacle for receiving a water supply,
  (ii) a water jet nozzle,
 (B) a lower assembly including
  (iii) a discharge tube having an upper end, a lower end, and an inside surface surrounding a passageway through the discharge tube, the upper end of the discharge tube having a transverse opening comprising an unobstructed water jet receiving portion and a rim portion, the rim portion being between the water jet receiving portion and the inside surface of the discharge tube, the water jet receiving portion being aligned to receive a jet of water from the water jet nozzle of the upper assembly;
  (iv) a venturi structure inside the discharge tube, the venturi structure being between the upper end of the discharge tube and the lower end of the discharge tube,
  (v) a liquid entrainment side passageway into the venturi structure,
  (vi) a backflow deflector between an air gap and an inlet into the venturi structure;
 (C) connecting structure connecting the upper assembly to the lower assembly, the connecting structure providing the air gap between the water jet nozzle of the upper assembly and the backflow deflector of the lower assembly; and
wherein the backflow deflector comprises a transverse backflow deflector plate, the deflector plate blocking a first part of the rim portion of the opening at the upper end of the discharge tube while leaving unblocked both the water jet receiving portion of the opening as well as a second rim part of the opening at the upper end of the discharge tube, the blocked first part of the rim being from 40 to 80 percent of the rim area and the unblocked second part of the rim being from 20 to 60 percent of the rim area, with the blocked first part of the rim and the unblocked second part of the rim providing a bifurcated asymmetry of from 40% to 100%.

2. The air gap eductor according to claim 1, wherein the blocked first part of the rim is from 45 to 75 percent of the rim area and the unblocked second part of the rim is from 25 to 55 percent of the rim area, with the blocked first part of the rim and the unblocked second part of the rim providing a bifurcated asymmetry of from 50% to 100%.

3. The air gap eductor according to claim 1, wherein the blocked first part of the rim is from 50 to 75 percent of the rim area and the unblocked second part of the rim is from 25 to 50 percent of the rim area, with the blocked first part of the rim and the unblocked second part of the rim providing a bifurcated asymmetry of from 50% to 100%.

4. The air gap eductor according to claim 1, wherein the blocked first part of the rim is from 50 to 60 percent of the rim area and the unblocked second part of the rim is from 40 to 50 percent of the rim area, with the blocked first part of the rim and the unblocked second part of the rim providing a bifurcated asymmetry of from 80% to 100%.

5. The eductor according to claim 1, wherein the backflow deflector is made from a thermoplastic composition and is nonporous.

6. The eductor according to claim 1, wherein the water jet receiving portion of the opening at the upper end of the discharge tube is centrally positioned relative to the discharge tube passageway.

7. The eductor according to claim 1, wherein the backflow deflector has a lower surface which is substantially perpendicular to an axis of the discharge tube.

8. The eductor according to claim 1, wherein the backflow deflector has an integral collar and press fits around an outside surface of the discharge tube.

9. The eductor according to claim 1, wherein the backflow deflector has an integral collar and press fits into the inside surface of the discharge tube.

10. The eductor according to claim 1, wherein the backflow deflector has a plurality of integral legs that extend into the inside of the discharge tube.

11. The eductor according to claim 1, wherein the water jet nozzle has a circular orifice for emitting a jet of water having a circular cross-section, the discharge tube has a circular cross section, the water jet receiving portion of the opening at the upper end of the discharge tube is circular, the backflow deflector has an integral circular collar that press fits into the inside surface of the discharge tube, and the backflow deflector has a plurality of integral legs that extend into the inside of the discharge tube.

12. The eductor according to claim 11, wherein the circular orifice on the water jet nozzle has a diameter of from 1.5 to 2.5 millimeters, and the water jet receiving portion has a diameter of from 4 to 6 millimeters and the air gap is from 20 to 35 millimeters.

13. The eductor according to claim 12, wherein the air gap is from 25 to 30 millimeters and the blocked portion of the rim is 50 percent of the rim area and the unblocked second portion of the rim is 50 percent of the rim area, with the blocked first portion of the rim and the unblocked second portion of the rim providing a bifurcated asymmetry of 100%.

14. The eductor according to claim 11, wherein the plurality of legs consists of four legs, with three of the legs having lower ends connected by an integral connector, the connector positioned on an opposite side of the backflow deflector from the deflector plate.

15. The eductor according to claim 14, wherein the connector is arcuate and is secured to an inside surface of each of the three legs, and the circular orifice on the water jet nozzle has a diameter of from 1.5 to 2.5 millimeters, the water jet receiving portion has a diameter of from 4 to 6 millimeters, the air gap is from 25 to 30 millimeters, and the blocked portion of the rim is 50 percent of the rim area and the unblocked second portion of the rim is 50 percent of the rim area, with the blocked first portion of the rim and the unblocked second portion of the rim providing a bifurcated asymmetry of 100%.

16. The eductor according to claim 1, wherein the backflow deflector is the only deflector between the venturi structure and the air gap.

17. The eductor according to claim 1, wherein the backflow deflector has a backflow deflector surface that is upwardly sloping away from an inside surface of the discharge tube.

18. The eductor according to claim 1, further comprising a bypass channel for flow bypassing the venturi structure, with an inner wall of the bypass channel comprising a plurality of spaced grooves extending substantially parallel to the axis of the discharge tube.

19. The eductor according to claim 1, wherein the lower assembly further comprises a flow restrictor comprising a flow restrictor plug removably received in a socket in the lower assembly, the flow restrictor plug having a plurality of grooves with each groove having a different cross sectional size, with the plug positioned so that a selected groove of the plurality of grooves is positioned to provide a flow rate corresponding with the cross sectional size of the groove.

* * * * *